(12) United States Patent
Mokire et al.

(10) Patent No.: US 8,424,777 B2
(45) Date of Patent: Apr. 23, 2013

(54) REDUCING AGENT HEATING SYSTEM

(75) Inventors: Mahesh K. Mokire, Peoria, IL (US);
Rishabh Sinha, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1272 days.

(21) Appl. No.: 12/070,498

(22) Filed: Feb. 19, 2008

(65) Prior Publication Data
US 2009/0205320 A1 Aug. 20, 2009

(51) Int. Cl.
*B60H 1/00* (2006.01)
*F01N 3/00* (2006.01)

(52) U.S. Cl.
USPC .............. 237/12.3 R; 60/286; 60/295; 60/303

(58) Field of Classification Search ............. 237/12.3 R; 60/286, 303, 295
See application file for complete search history.

(56) References Cited

U.S. PATENT DOCUMENTS

| | | | | |
|---|---|---|---|---|
| 5,063,513 | A * | 11/1991 | Shank et al. | 237/12.3 R |
| 5,845,485 | A * | 12/1998 | Murphy et al. | 60/286 |
| 6,063,350 | A | 5/2000 | Tarabulski et al. | |
| 6,519,935 | B2 | 2/2003 | Weigl | |
| 6,662,553 | B2 * | 12/2003 | Patchett et al. | 60/286 |
| 6,681,811 | B2 | 1/2004 | Channing | |
| 6,739,126 | B2 | 5/2004 | Huthwohl | |
| 6,810,661 | B2 | 11/2004 | Lambert et al. | |
| 6,901,748 | B2 | 6/2005 | Gomulka | |
| 7,293,408 | B2 | 11/2007 | Kohler et al. | |
| 7,930,878 | B2 * | 4/2011 | Cook et al. | 60/303 |
| 2002/0088220 | A1 * | 7/2002 | Weigl | 60/286 |
| 2004/0226285 | A1 * | 11/2004 | Gomulka | 60/286 |
| 2006/0048503 | A1 * | 3/2006 | Havers | 60/286 |
| 2006/0213473 | A1 * | 9/2006 | Theorell et al. | 123/142.5 R |
| 2007/0079599 | A1 | 4/2007 | Osaku et al. | |
| 2007/0092413 | A1 | 4/2007 | Hirata et al. | |
| 2007/0157602 | A1 * | 7/2007 | Gschwind | 60/286 |
| 2007/0199308 | A1 * | 8/2007 | Satou et al. | 60/286 |
| 2008/0110158 | A1 * | 5/2008 | Esaka | 60/286 |
| 2008/0179414 | A1 * | 7/2008 | Bentz et al. | 237/12.3 R |
| 2008/0202473 | A1 * | 8/2008 | Cook et al. | 123/478 |
| 2008/0223021 | A1 * | 9/2008 | Shaikh et al. | 60/295 |
| 2009/0028533 | A1 * | 1/2009 | Starck | 60/286 |
| 2009/0139214 | A1 * | 6/2009 | Reed | 60/286 |
| 2010/0050606 | A1 * | 3/2010 | Fulks et al. | 60/286 |
| 2010/0095653 | A1 * | 4/2010 | Thiagarajan et al. | 60/286 |
| 2010/0199647 | A1 * | 8/2010 | Cruz et al. | 60/303 |
| 2011/0000196 | A1 * | 1/2011 | Kasahara | 60/286 |
| 2011/0030349 | A1 * | 2/2011 | Makartchouk et al. | 60/286 |

FOREIGN PATENT DOCUMENTS

DE 102006046900 A1 * 10/2006
JP 2007113403 A * 5/2007

OTHER PUBLICATIONS

Matsunaga, JP2007113403 English machine translation, May 10, 2007.*

* cited by examiner

*Primary Examiner* — Steven B McAllister
*Assistant Examiner* — Phillip E Decker
(74) *Attorney, Agent, or Firm* — Finnegan, Henderson, Farabow, Garrett & Dunner LLP

(57) ABSTRACT

A reducing agent heating system. The reducing agent heating system provides a dual energy heating strategy using both an electric heater and an engine coolant line such that emission control may be promoted efficiently. The electric heater and engine coolant line are disposed in close proximity to the reducing agent such that efficient and quick thawing of frozen or freezing reducing agent is facilitated.

7 Claims, 5 Drawing Sheets

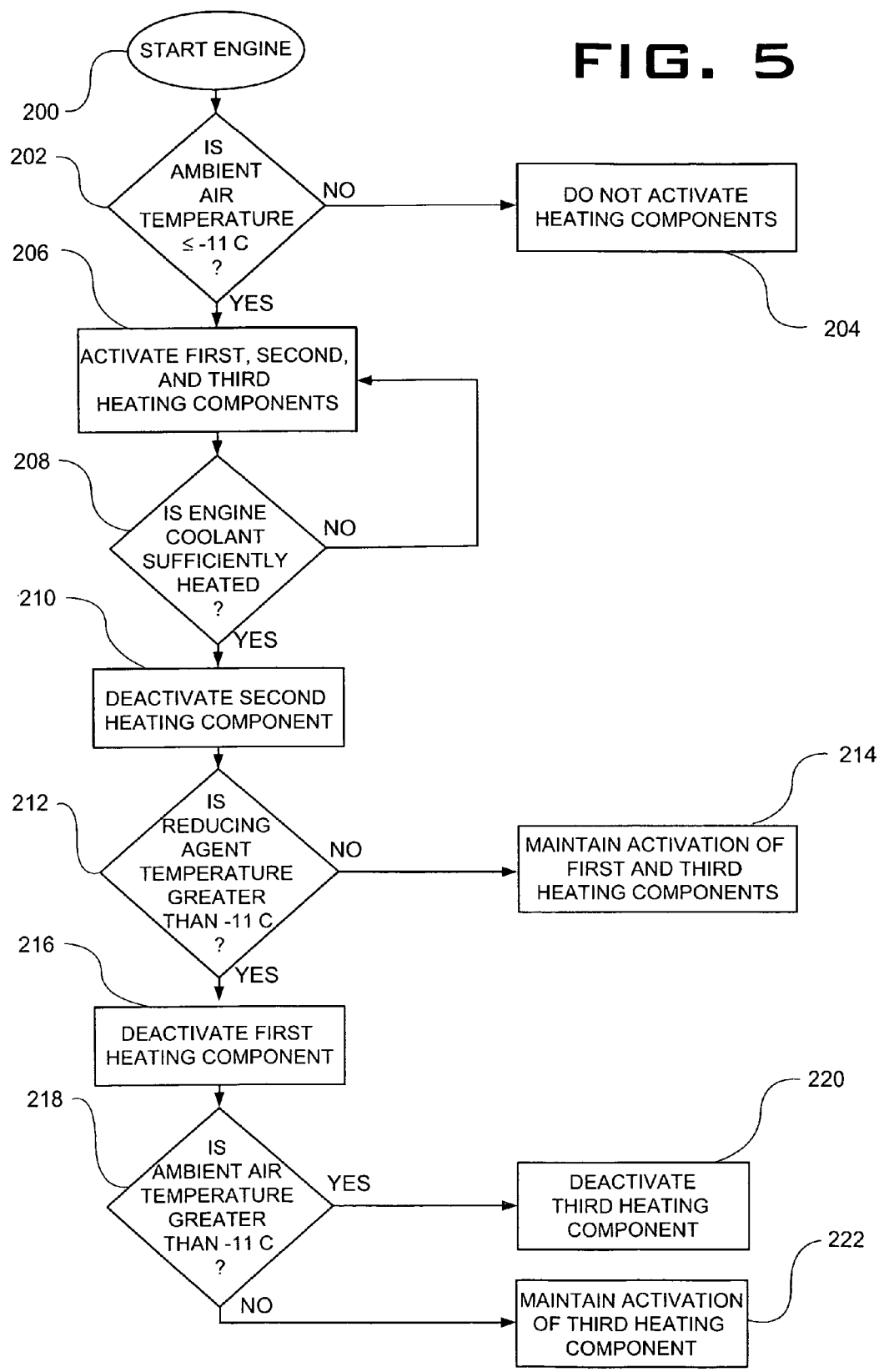

REDUCING AGENT HEATING SYSTEM

TECHNICAL FIELD

The present disclosure relates to a system for heating a reducing agent, and, more particularly, to a system and method for heating a reducing agent disposed in a tank and in various supply lines on an engine.

BACKGROUND

Internal combustion engines, including diesel engines, gasoline engines, gaseous fuel-powered engines, and other engines known in the art exhaust a complex mixture of air pollutants. These air pollutants are composed of gaseous compounds, such as, for example, the oxides of nitrogen (NOx). Due to increased awareness of the environment, exhaust-emission standards have become more stringent, and the amount of NOx emitted from an engine may be regulated depending on the type of engine, size of engine, and/or class of engine. In order to ensure compliance with the regulation of these compounds, some engine manufacturers have implemented a strategy called Selective Catalytic Reduction (SCR). SCR is a process where a gaseous or liquid reductant or reducing agent, e.g., a urea/water solution, is added to the exhaust gas stream of an engine and absorbed onto a catalyst. The reducing agent reacts with NOx in the exhaust gas to form $H_2O$ and $N_2$, thereby reducing harmful emissions. The reducing agent is typically stored in a tank that has a supply line for providing the reducing agent to the exhaust stream.

Engines are often used in machines or in stationary applications that are located in extreme cold temperature environments. The cold temperature environments are particularly harsh on an engine when the engine is shut off over extended periods of time, such as overnight. In cold temperature environments, for example, when the ambient air temperature is less than $-11°$ C., the reducing agent may freeze, either in the tank and/or in the supply line. In view of increased demands of exhaust emission standards, the reducing agent needs to be liquefied such that the exhaust stream receives the required dosage of reducing agent from the tank. Furthermore, the reducing agent needs to be liquefied within a certain time period after engine starting to ensure that the engine meets the exhaust emission standards within a certain amount of time after engine starting.

One system for heating a reducing agent is described in U.S. Patent Application Publication No. 2007/0079599 (the '599 application), published on Apr. 12, 2007 in the name of Osaku et al. and assigned to Nissan Diesel Motor Co., Ltd. The '599 application discloses a system that uses cooling water from an engine as a heat carrier to heat urea water in a urea storage tank via a heat exchanger pipe routed through the urea storage tank.

Although the system disclosed in the '599 application may provide a system for heating a reducing agent, the system does not address all of the requirements listed above. For example, the engine must warm up and heat the cooling water circulating therein prior to having any heat exchanging effect on the reducing agent. Since this may create a delay from when the engine is started to when the cooling water can deliver a heating effect to the reducing agent, the engine may fail to satisfy exhaust emission standards within the required time period. This is due to the reducing agent not being sufficiently thawed, and thus the nitrogen oxide reduction is not sufficiently completed prior to expelling the exhaust gases from the engine.

The disclosed system is directed to addressing the desire to have a liquefied reducing agent available shortly after the start-up of the engine.

SUMMARY

In one aspect, the present disclosure is directed toward a reducing agent heating system for an engine including a reducing agent storage container configured for housing a reducing agent, a first heating component positioned proximate the reducing agent storage container, and a second heating component disposed at least partially in the reducing agent storage container.

In another aspect, the present disclosure is directed toward a heating apparatus for use with an engine including a reducing agent distribution system for distributing a reducing agent, the heating apparatus including at least one engine coolant line extending from the engine and positioned proximate the reducing agent distribution system, and an electric heater positioned proximate the reducing agent distribution system.

In yet another aspect, the present disclosure is directed toward a method for heating a reducing agent for use in an engine, the method including the steps of providing a reducing agent storage container configured for housing a reducing agent, providing a first heating component positioned proximate the reducing agent storage container, activating the first heating component, providing a second heating component disposed at least partially in the reducing agent storage container, and activating the second heating component.

BRIEF DESCRIPTION OF THE DRAWINGS

FIG. 5 is a diagram of an exemplary control strategy according to the present disclosure.

DETAILED DESCRIPTION

Figure 1:
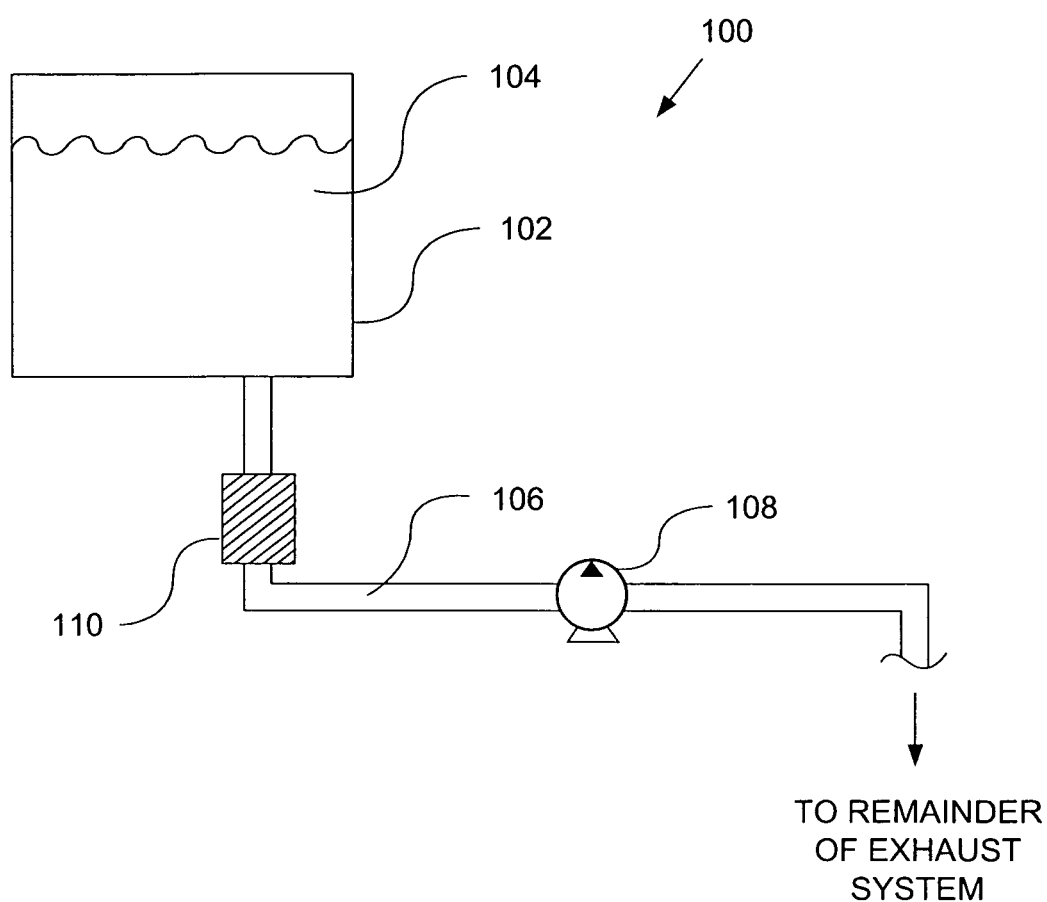
FIG. 1 is a schematic view of a portion of an exhaust system for an engine including a reducing agent system.

FIG. 1 illustrates a schematic view of a reducing agent system 100, which forms a portion of an exhaust aftertreatment system for an engine (not shown). The aftertreatment system may be configured to direct exhaust gas from the engine to the atmosphere and to reduce the amount of certain exhaust gas constituents within the expelled exhaust gas. In one example, nitrogen oxide (NOx) within the exhaust gas passes through a catalyst which is configured to react with a reducing agent mixed with the exhaust gas to convert NOx into $N_2$. The system 100 may include a reducing agent 104 housed in a reducing agent tank or storage container 102. The reducing agent 104 may include, for example, an urea/water solution, ammonia, and/or AdBlue® solution (AdBlue® is a registered trademark of the Verband Der Automobilindustrie E.V. (VDA) Association of Germany). The reducing agent 104 is distributed to an exhaust gas stream (not shown) via a reducing agent distribution or supply line 106 and, optionally, a reducing agent pump 108. A third heating component 110, which may include a wound-wire heating element, may be circumferentially disposed around the reducing agent supply line 106 either upstream or downstream of the pump 108 to prevent freezing of the reducing agent 104 disposed in the reducing agent supply line 106. The third heating component 110 may also be formed as a long, cable-like electric heating element which is wrapped around the reducing agent supply line 106, or as a thermal insulator which covers the reducing agent supply line 106 to melt frozen reducing agent 104 contained therein and/or to prevent freezing of the reducing agent 104 contained therein.

Figure 2:
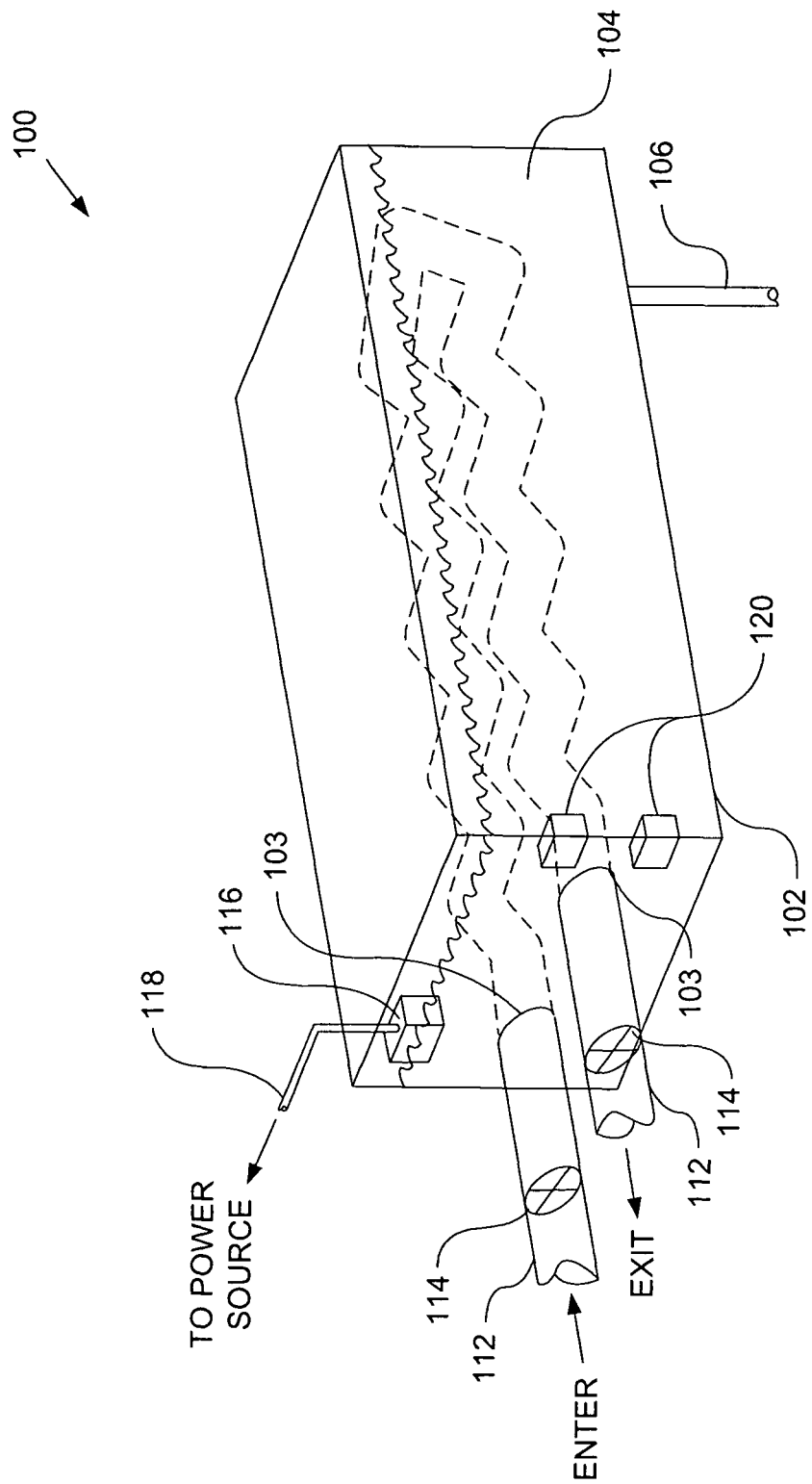
FIG. 2 is a perspective view of a reducing agent system according to one embodiment of the present disclosure.
Figure 3:
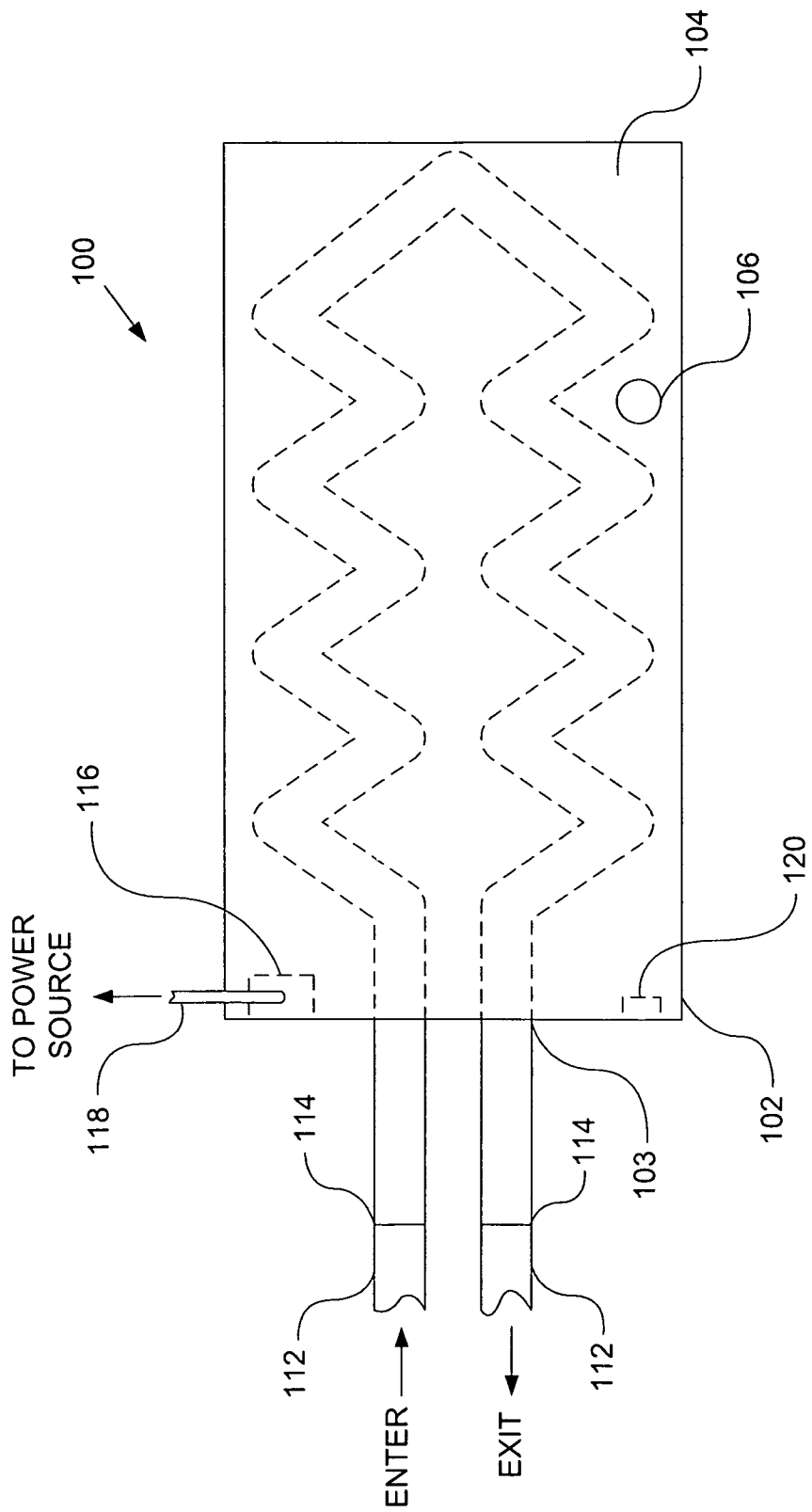
FIG. 3 is a top view of the reducing agent system of FIG. 2.

FIG. 2 illustrates a portion of an exhaust system, which includes an exemplary reducing agent system 100 for heating the reducing agent 104 contained in the reducing agent tank 102. The tank 102 may include two reducing agent tank openings 103 which provide openings or pathways for passage of a first heating component or an engine coolant line 112 into the tank 102. The engine coolant line 112 may be formed as stainless steel tubing, or any other non-corrosive material, that extends into the tank 102. The engine coolant line 112 may enter the tank 102 via a first opening 103, as denoted at the ENTER arrow, and exit the tank 102 via a second opening 103, as denoted at the EXIT arrow. As shown in FIGS. 2 and 3, the engine coolant line 112 may be formed in a "zigzag" pattern inside the tank 102 such that a maximum surface area, i.e., heat transfer circumferential area, of the engine coolant line 112 contacts the reducing agent 104. This facilitates warming and/or thawing of the reducing agent 104. Alternatively, the engine coolant line 112 may be formed in a "sine-wave" pattern, or any other suitable pattern that increases the amount of surface area of the engine coolant line 112 in contact with reducing agent 104.

Referring again to FIG. 2, the engine coolant line 112 may be positioned near a portion of the tank 102 from which the reducing agent supply line 106 extends, such that a portion of the reducing agent 104 closest to the supply line 106 is warmed and/or thawed first. The engine coolant line 112 may include one or more engine coolant line valves 114 that can control the flow of engine coolant through the engine coolant line 112, as described below. The reducing agent tank 102 also may include at least one reducing agent temperature sensor 120 positioned oh or proximate a wall of the reducing agent tank 102. The sensors 120 are positioned a sufficient distance from the engine coolant line 112 such that the sensors 120 do not detect the temperature of the engine coolant, but instead only detect the temperature of the reducing agent 104. The system 100 further includes a second heating component or an electric heater 116 disposed within the reducing agent tank 102 and at least partially immersed in the reducing agent 104. The electric heater 116 includes an electric heater cord 118 which may exit the reducing agent tank 102 to provide power and control to the electric heater 116.

Figure 4:
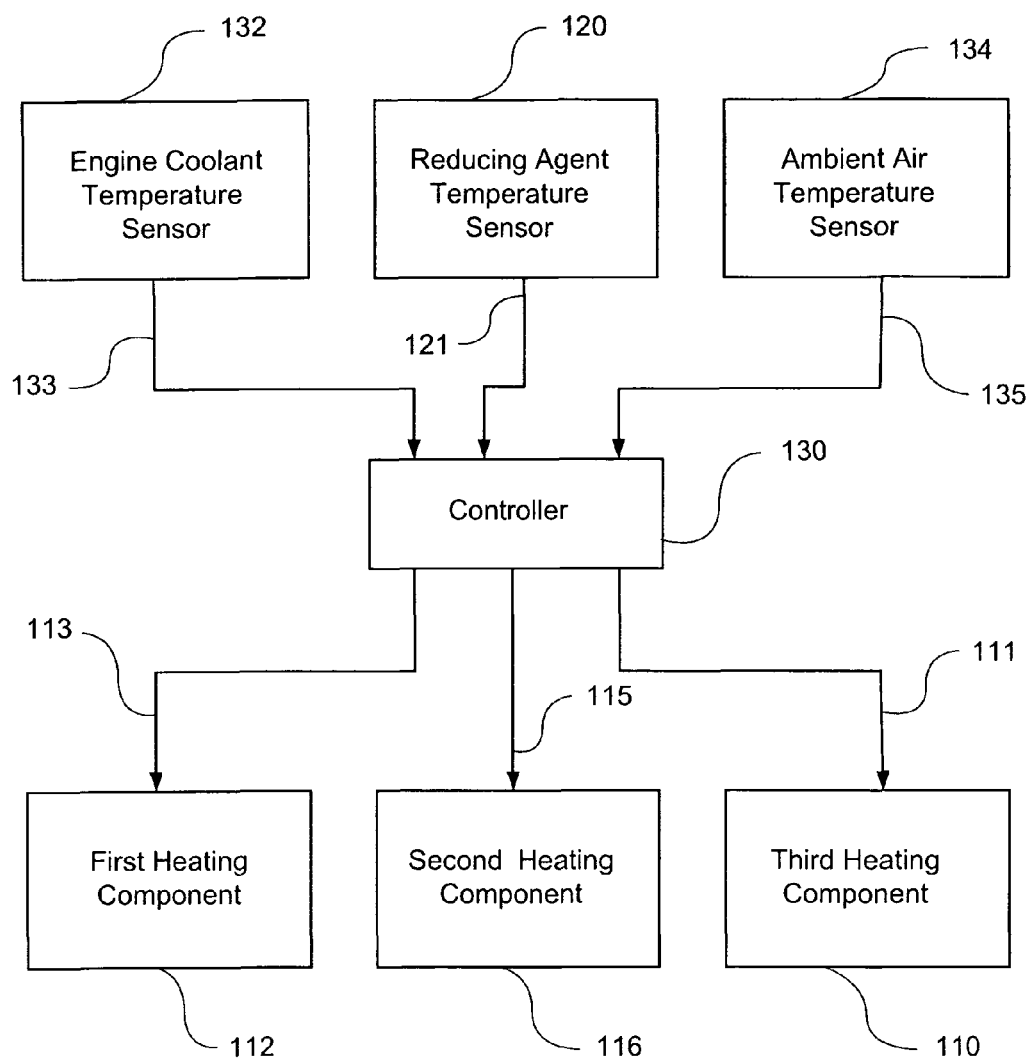
FIG. 4 is a diagram of an exemplary control system according to the present disclosure.

FIG. 4 illustrates a control system for controlling operation of the engine coolant line 112, the electric heater 116, and the third heating component 110. A controller 130 may receive inputs from an engine coolant temperature sensor 132, a reducing agent temperature sensor 120, and an ambient air temperature sensor 134. Based on the input received, the controller 130 may provide control signals to the engine coolant line 112, the electric heater 116, and the third heating component 110. The sensors 132, 120, 134 may be in communication with the controller 130 via communication lines 133, 121, 135, respectively, and be configured to generate input signals indicative of temperatures of the engine coolant, the reducing agent, and the ambient air, respectively. For example, given inputs from the sensors 132, 120, 134, the controller 130 may operate one or all of the engine coolant line 112, the electric heater 116, and the third heating component 110 by sending control signals via communication lines 113, 115, and 111, respectively, to facilitate thawing the reducing agent 104.

The controller 130 may embody a single microprocessor or multiple microprocessors that include a means for controlling an operation of the system 100. Numerous commercially available microprocessors can be configured to perform the functions of the controller 130. It should be appreciated that the controller 130 could readily embody a general machine or power unit microprocessor capable of controlling numerous machine or engine functions. The controller 130 may include all the components required to run an application, such as, for example, a memory, a secondary storage device, and a processor, such as a central processing unit or any other mechanism that can be used for controlling the system 100. Various other circuits may be associated with the controller 130, including power supply circuitry, signal-conditioning circuitry, solenoid driver circuitry, communication circuitry, and other appropriate circuitry.

FIG. 5 illustrates a control strategy, which may be implemented in the controller 130 (FIG. 4). The control strategy begins with step 200 in which an operator starts an engine equipped with the system 100. At step 202, the controller 130 receives an input via the communication line 135 from the ambient air temperature sensor 134 and determines whether the ambient air temperature is less than or equal to −11° C. If the ambient air temperature is above −11° C., the control strategy ends with step 204 in which no heating components are activated because there is no danger of the reducing agent 104 freezing or being frozen. However, if the ambient air temperature is less than or equal to −11° C., the control strategy proceeds to step 206 in which the controller 130 sends control signals to activate the engine coolant line 112, the electric heater 116, and the third heating component 110 via the communication lines 113, 115, 111, respectively.

Activation of the engine coolant line 112 causes the engine coolant line valves 114 to open, thereby permitting engine coolant from the engine to circulate through and/or proximate the reducing agent tank 102. Activation of the electric heater 116 causes a power source (not shown) to provide power to the electric heater 116, thereby warming the reducing agent 104 proximate the electric heater 116. As the electric heater 116 warms up the reducing agent 104, the warmed reducing agent 104 begins to proliferate throughout the remainder of the tank 102, thereby facilitating further warming of the reducing agent 104. Activation of the third heating component 110 causes any frozen reducing agent 104 in the supply line 106 to thaw or prevents any reducing agent 104 in the supply line 106 from freezing.

The controller 130 then periodically monitors signal inputs from the engine coolant temperature sensor 132 until the sensor 132 indicates that engine coolant has reached a sufficient temperature, e.g., above −11° C., at which the engine coolant can heat frozen or freezing reducing agent 104. Once the sensor 132 indicates that the engine coolant has reached this threshold temperature, the electric heater 116 is deactivated in step 210 to prevent causing evaporation of the water portion of the reducing agent 104 due to overheating of the reducing agent 104. The engine coolant line 112 and the third heating component 110 remain activated as long as the temperature of the reducing agent 104 remains less than or equal to −11° C., as shown in steps 212 and 214. If the result of step 212 is that the reducing agent temperature sensor 120 indicates that the temperature of the reducing agent 104 is greater than −11° C., then the engine coolant line 112 is deactivated in step 216 to prevent overheating of the reducing agent 104. Deactivation of the engine coolant line 112 involves the step of closing at least one valve 114 to prevent any flow of engine coolant through or proximate the reducing agent tank 102.

The third heating component 110 remains activated as long as the ambient air temperature remains less than or equal to −11° C., as shown in-steps 218 and 222. If the result of step 218 is that the ambient air temperature sensor 134 indicates that the ambient air temperature is greater than −11° C., then the third heating component 110 is deactivated in step 220.

The controller 130 monitors inputs from the engine coolant temperature sensor 132, the reducing agent temperature sensor 120, and the ambient air temperature sensor 134 throughout the duration of engine use and provides control signals to the engine coolant line 112, the electric heater 116, and the third heating component 110 as necessary to prevent freezing of the reducing agent 104. For example, during use of the engine, if the ambient air temperature falls below or equal to −11° C., the controller 130 may start the control strategy at step 202 to ensure that the reducing agent 104 does not freeze. In another example, the engine may be placed into an idling state during use, at which point the engine coolant temperature may drop below the threshold temperature. If this scenario occurs, the controller 130 may start the control strategy at step 208 and activate the engine coolant line 112, the electric heater 116, and the third heating component 110. In yet another example, if the temperature of the reducing agent 104 falls below or equal to −11° C., the controller 130 may start the control strategy at step 212 and activate the engine coolant line 112 and the third heating component 110.

Industrial Applicability

The disclosed reducing agent heating system may be applicable to any engine operating in extreme cold environments, such as engines used with on-highway trucks, construction equipment, mining equipment, and power generation equipment, for example. The reducing agent heating system provides a dual energy heating strategy using both an electric heater and engine coolant lines such that emission control may be promoted efficiently.

In operation, the engine coolant line 112 and the electric heater 116 may heat frozen or freezing reducing agent 104 to return the reducing agent 104 to a liquid state in the tank 102. Moreover, the third heating component 110 may heat frozen or freezing reducing agent 104 to return the reducing agent 104 to a liquid state in the supply line 106.

After starting the engine, the controller 130 determines whether the ambient air temperature is less than or equal to −11° C. If the ambient air temperature is less than or equal to −11° C., the reducing agent 104 is highly likely to be frozen or freezing. The controller 130 then activates the engine coolant line 112, the electric heater 116, and the third heating component 110. The engine coolant line 112 and the electric heater 116 together form a dual energy heating mechanism for initially thawing frozen or freezing reducing agent 104 in the tank 102. The electric heater 116 is utilized to initially heat the reducing agent 104 because the engine coolant from the engine immediately after starting is potentially not warm enough to heat the reducing agent 104. Thus, both the engine coolant line 112 and the electric heater 116 are activated until the engine coolant reaches a threshold temperature at which the engine coolant may be solely used to heat the reducing agent 104. Once the engine coolant reaches this threshold temperature, the electric heater 116 is deactivated. After the electric heater 116 is deactivated to prevent overheating of the reducing agent 104, the engine coolant is used to warm the reducing agent 104 until the reducing agent temperature sensors 120 indicate that the temperature of the reducing agent 104 is greater than −11° C., at which point the engine coolant line 112 is deactivated by closing the valves 114 to prevent overheating of the reducing agent 104.

The third heating component 110 provides an additional protective measure for the system 100 by ensuring that the reducing agent 104 in the supply line 106 thaws and remains thawed. The third heating component 110 remains activated by the controller 130 until the ambient air temperature exceeds −11° C., at which point the third heating component 110 is deactivated because the danger of the reducing agent 104 freezing in the supply line 106 no longer exists.

By providing a dual energy heating mechanism, the system 100 can immediately begin to thaw the reducing agent 104 in the tank 102 without requiring engine warm-up after starting. The electric heater 116 provides an immediate thawing capability to the system 100 and then can be selectively deactivated to prevent overheating of the reducing agent 104 once the engine has sufficiently warmed. Therefore, the engine can more efficiently and quickly comply with exhaust emission standards after engine starting.

It will be apparent to those skilled in the art that various modifications and variations can be made to the disclosed reducing agent heating system without departing from the scope of the disclosure. Other embodiments of the reducing agent heating system will be apparent to those skilled in the art from consideration of the specification and practice of the reducing agent heating system disclosed herein. It is intended that the specification and examples be considered as exemplary only, with a true scope of the disclosure being indicated by the following claims and their equivalents.

What is claimed is:

1. A reducing agent heating system for an engine, comprising:
    a reducing agent storage container configured for housing a reducing agent and including a reducing agent supply line extending therefrom;
    a first heating component positioned proximate said reducing agent storage container;
    a second heating component disposed at least partially in said reducing agent storage container;
    a third heating component disposed proximate said reducing agent supply line;
    an ambient air temperature sensor coupled to a controller;
    an engine coolant temperature sensor coupled to a controller; and
    a reducing agent temperature sensor coupled to the controller, the controller being configured to control activation and deactivation of the first, second, and third heating components based on signals received from the ambient air temperature sensor, the engine coolant temperature sensor, and the reducing agent temperature sensor.

2. The reducing agent heating system of claim 1, wherein said second heating component comprises an electric heater positioned proximate said reducing agent.

3. The reducing agent heating system of claim 1, wherein said first heating component comprises at least one engine coolant line extending from the engine and positioned proximate said reducing agent storage container.

4. The reducing agent heating system of claim 3, wherein said engine coolant line includes at least one valve, said valve configured to control flow of engine coolant through said engine coolant line.

5. The reducing agent heating system of claim 1, wherein said first heating component comprises at least one engine coolant line extending from the engine and into said reducing agent storage container.

6. The reducing agent heating system of claim 5, wherein said engine coolant line includes at least one valve, said valve configured to control flow of engine coolant through said engine coolant line.

7. The reducing agent heating system of claim 1, wherein said third heating component comprises a wound wire heating element disposed circumferentially around at least a portion of said reducing agent supply line.

* * * * *